United States Patent
Zhou

(10) Patent No.: US 11,952,519 B2
(45) Date of Patent: Apr. 9, 2024

(54) QUANTUM ROD, QUANTUM ROD FILM COMPRISING SAME, AND DISPLAY DEVICE COMPRISING SAME

(71) Applicant: TCL CHINA STAR OPTOELECTRONICS TECHNOLOGY CO., LTD., Guangdong (CN)

(72) Inventor: Miao Zhou, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 1028 days.

(21) Appl. No.: 16/756,924

(22) PCT Filed: Apr. 3, 2020

(86) PCT No.: PCT/CN2020/083344
§ 371 (c)(1),
(2) Date: Apr. 17, 2020

(87) PCT Pub. No.: WO2021/184440
PCT Pub. Date: Sep. 23, 2021

(65) Prior Publication Data
US 2022/0306937 A1    Sep. 29, 2022

(30) Foreign Application Priority Data
Mar. 18, 2020 (CN) .......................... 202010191899.5

(51) Int. Cl.
C09K 11/06 (2006.01)
C09K 11/02 (2006.01)
(Continued)

(52) U.S. Cl.
CPC .......... *C09K 11/0811* (2013.01); *C09K 11/02* (2013.01); *C09K 11/883* (2013.01);
(Continued)

(58) Field of Classification Search
CPC ... C09K 11/0811; C09K 11/02; C09K 11/883; G02B 1/04; G02B 2207/101; G02F 1/133514; B82Y 20/00
See application file for complete search history.

(56) References Cited

U.S. PATENT DOCUMENTS 10,174,249 B2 * 1/2019 Kim .................. C09K 19/3852
10,246,638 B1    4/2019 Koposov
(Continued)

FOREIGN PATENT DOCUMENTS

CN    102604639 A    7/2012
CN    103154183 A    6/2013
(Continued)

OTHER PUBLICATIONS

Controlled synthesis of high quality type-II/type-I CdS/ZnSe/ZnS core/shell1/shell2 nanocrystals, Niu et al., Dalton Trans., 2010, 39, 3308-3314.*
(Continued)

Primary Examiner — Haidung D Nguyen
(74) Attorney, Agent, or Firm — Dickinson Wright PLLC

(57) ABSTRACT

The present disclosure provides a quantum rod, a quantum rod film including the same, and a display device including the same. The quantum rod includes a core, a shell layer, and a rod-shaped protective layer. The core is composed of cadmium sulfide. The shell layer is composed of zinc selenide and covers the core. The rod-shaped protective layer is composed of zinc sulfide and covers the shell layer.

20 Claims, 3 Drawing Sheets

(51) Int. Cl.
*C09K 11/08* (2006.01)
*C09K 11/88* (2006.01)
*G02B 1/04* (2006.01)
*G02F 1/1335* (2006.01)
*H01L 33/02* (2010.01)
*B82Y 20/00* (2011.01)

(52) U.S. Cl.
CPC ......... *G02B 1/04* (2013.01); *G02F 1/133514* (2013.01); *B82Y 20/00* (2013.01); *G02B 2207/101* (2013.01)

(56) References Cited

U.S. PATENT DOCUMENTS

| | | |
|---|---|---|
| 2009/0034056 A1 | 2/2009 | Choi |
| 2015/0177560 A1 | 6/2015 | Weiss |
| 2016/0075943 A1 | 3/2016 | Kim et al. |
| 2017/0110625 A1* | 4/2017 | Zhao ............... C09K 11/08 |
| 2019/0103524 A1 | 4/2019 | Jang |
| 2019/0129252 A1 | 5/2019 | Srivastava et al. |

FOREIGN PATENT DOCUMENTS

| | | |
|---|---|---|
| CN | 104680942 A | 6/2015 |
| CN | 106932949 A | 7/2017 |
| CN | 107819078 A | 3/2018 |
| CN | 109313366 A | 2/2019 |
| CN | 110028963 A | 7/2019 |

OTHER PUBLICATIONS

Synthesis of Highly Luminescent and Photo-Stable, Graded Shell CdSe/CdxZn1-xS Nanoparticles by In Situ Alloying, Boldt et al., | Chem. Mater. 2013, 25, 4731-4738.*
Strongly fluorescent hydrogels with quantum dots embedded in cellulose matrices, Chang et al., J. Mater. Chem., 2009, 19, 7771-7776.*

* cited by examiner

QUANTUM ROD, QUANTUM ROD FILM COMPRISING SAME, AND DISPLAY DEVICE COMPRISING SAME

FIELD OF INVENTION

The present disclosure relates to the technical field of display, and particularly to a quantum rod, a quantum rod film comprising the same, and a display device comprising the same.

BACKGROUND

In early days, a liquid crystal display adopted a color filter comprising red, green, and blue color resists and a white-light backlight source to achieve color display. However, absorption spectrums of the color resists are relatively wide, so spectrum of white light passing through the color resists is also relatively wide, which leads to a lower color gamut of the liquid crystal display. Currently, a liquid crystal display adopts a quantum dot (QD) color filter and a blue-light backlight source to improve color gamut. However, fluorescence emitted by quantum dots is not polarized, so brightness will decrease by more than 50% after passing through a polarizer. A quantum rod (QR) has an anisotropic morphology, so fluorescence emitted thereby is polarized, which can solve the above problem.

In current quantum rods, development of CdSe/CdS green-light quantum rods is the most mature. However, the green-light quantum rods are not easy to prepare, and their excitation peaks do not match emission peaks of commonly used blue-light backlight sources. Therefore, there is a need to develop a green-light quantum rod whose excitation peak is consistent with the emission peaks of the commonly used blue-light backlight sources.

SUMMARY OF DISCLOSURE

In order to solve the technical problem that excitation peaks of current green light quantum rods do not match emission peaks of blue light backlight sources, the present disclosure provides a quantum rod comprising a core, a shell layer, and a rod-shaped protective layer. The core is composed of cadmium sulfide. The shell layer is composed of zinc selenide and covers the core. The rod-shaped protective layer is composed of zinc sulfide and covers the shell layer.

In an embodiment, an emission peak of the quantum rod can be adjusted by adjusting a size of the core and a thickness of the shell layer.

In an embodiment, the quantum rod further comprises an organic water blocking layer covering the rod-shaped protective layer.

In an embodiment, the organic water blocking layer is composed of a hydrogel.

In an embodiment, the quantum rod further comprises a plurality of ligands bonded to the rod-shaped protective layer.

In an embodiment, the ligands comprise organic phosphorus, organic phosphorus oxide, organic phosphoric acid, organic amine, organic carboxylic acid, organic carboxylic acid ester, olefin, alkyl mercaptan, pyridine or a combination thereof.

The present disclosure further provides a quantum rod film comprising a thin film and a plurality of the aforementioned quantum rods aligned in the thin film in an orientation.

In an embodiment, long axes of the quantum rods are parallel to each other and the thin film.

The present disclosure further provides a display device comprising a display panel, a backlight module, and a first quantum rod film disposed between the backlight module and the display panel. The first quantum rod film comprises a plurality of the aforementioned quantum rods arranged in an orientation.

In an embodiment, the display panel is a liquid crystal display panel comprising a first substrate, a second substrate disposed opposite to the first substrate, and a liquid crystal layer disposed between the first substrate and the second substrate. The first substrate sequentially comprises a substrate, a thin film transistor layer, and a second quantum rod film in a direction from the first substrate to the second substrate. The second quantum rod film comprises a plurality of the aforementioned quantum rods arranged in an orientation.

In an embodiment, the first substrate or the second substrate comprises a color filter. The color filter comprises a plurality of green filter units, a plurality of red filter units, and a plurality of blue filter units. The green filter units comprise a plurality of the aforementioned quantum rods arranged in an orientation.

In a quantum rod of the present invention, (1) a blue-green light-emitting cadmium sulfide core is used, (2) a zinc selenide shell layer is used to cover the core, so that blue-green light emitted by the core is red-shifted to green light, thereby forming a green light-emitting core-shell quantum dot, (3) a zinc sulfide rod-shaped protective layer is used to cover the core-shell quantum dot, so that the green light emitted by the core-shell quantum dot is polarized and quantum confinement effect is improved, thereby improving luminous efficiency and reliability. The quantum rod of the present invention has an excitation wavelength of about 445-450 nm and an excitation peak of about 450 nm, which are close to an emission wavelength of 447-452 nm of blue light-emitting diodes in a common blue light backlight source. Therefore, the quantum rod of the present invention has a high absorption efficiency of the blue light backlight source and thus has high excitation efficiency. The quantum rod of the present invention emits green light with a wavelength of about 520-550 nm, and its emission peak can be adjusted by adjusting a size of the core and a thickness of the shell layer. The emission peak is preferably about 525 nm. The light emitted by the quantum rod of the present invention has polarization and thus has high transmittance to a polarizer. Therefore, applying a quantum rod film composed of the quantum rod of the present invention to a display device, for example, as a polarizer disposed between a backlight module and a display panel, as a polarizer disposed in the display panel, or, after being patterned, as green filter units of a color filter, can improve performance of the display device.

BRIEF DESCRIPTION OF DRAWINGS

In order to more clearly illustrate the technical solutions in the embodiments of the present disclosure, a brief description of accompanying drawings used in the description of the embodiments of the present disclosure will be given below. Obviously, the accompanying drawings in the following description are merely some embodiments of the present disclosure. For those skilled in the art, other drawings may be obtained from these accompanying drawings without creative labor.

DETAILED DESCRIPTION

Figure 1:
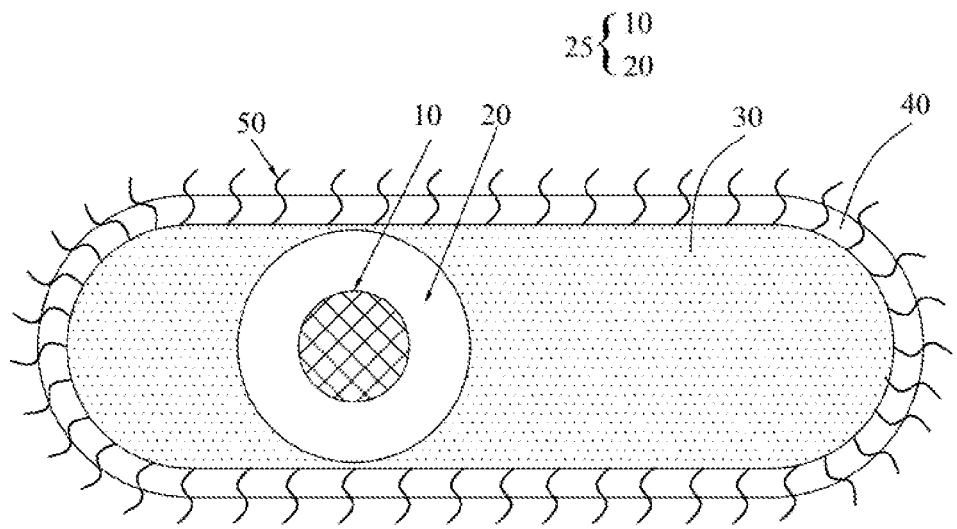
FIG. 1 is a schematic diagram of a quantum rod according to an embodiment of the present disclosure.

Please refer to FIG. 1, the present disclosure provides a quantum rod 100 comprising a core 10 composed of cadmium sulfide, a shell layer 20 composed of zinc selenide, and a rod-shaped protective layer 30 composed of zinc sulfide. The shell layer 20 covers the core 10 to form a core-shell quantum dot 25. The rod-shaped protective layer 30 covers the core-shell quantum dot 25. In this embodiment, the core-shell quantum dot 25 is close to an end of the rod-shaped protective layer 30. In an embodiment, the core-shell quantum dot 25 may be located at any position in the rod-shaped protective layer 30.

Figure 2:
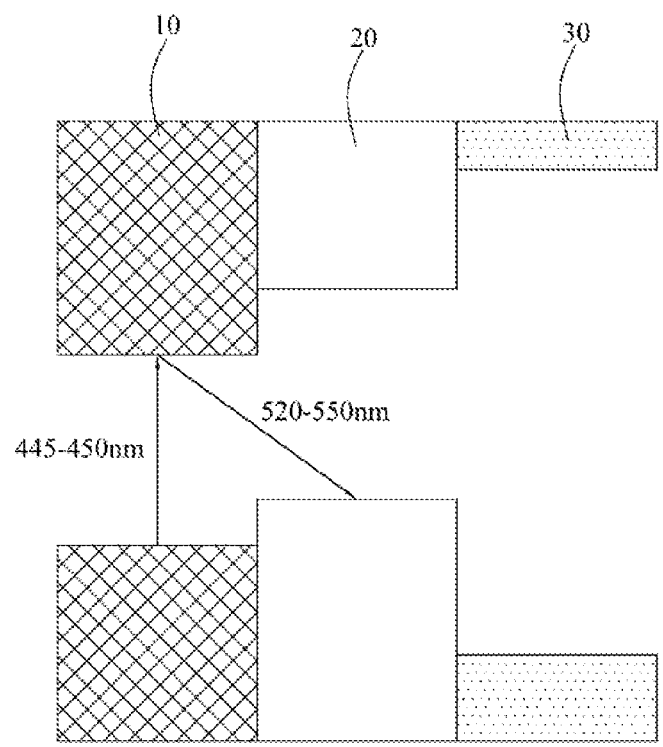
FIG. 2 is an energy band diagram of the quantum rod of FIG. 1.

Please refer to FIG. 2, the core 10 composed of cadmium sulfide has an excitation wavelength of about 445-450 nm and an excitation peak of about 450 nm, which are close to an emission wavelength of 447-452 nm of blue light-emitting diodes in a common blue-light backlight source. The core 10 emits blue-green light when excited. The shell layer 20 composed of zinc selenide red-shifts the blue-green light emitted by the core 10 to green light. The rod-shaped protective layer 30 composed of zinc sulfide makes the green light emitted by the core-shell quantum dots 25 polarized, improves quantum confinement effect, and further improves luminous efficiency and reliability. The quantum rod 100 has an excitation wavelength of about 445-450 nm and an excitation peak of about 450 nm, which are close to an emission wavelength of 447-452 nm of blue light-emitting diodes in a common blue-light backlight source. Therefore, the quantum rod 100 has a high absorption efficiency of the blue-light backlight source and thus has high excitation efficiency. The quantum rod 100 emits green light with a wavelength of about 520-550 nm, and its emission peak can be adjusted by adjusting a size of the core and a thickness of the shell layer. The emission peak is preferably about 525 nm. In an embodiment, the core 10 is a sphere with a radius of 3-5 nm, and the thickness of the shell layer is 2-5 monomolecular layers of zinc selenide, but they are not limited thereto. The light emitted by the quantum rod 100 has polarization and thus has high transmittance to a polarizer. The polarization of the light emitted by the quantum rod 100 can be adjusted by adjusting an aspect ratio of the rod-shaped protective layer 30.

Please refer to FIG. 1, in an embodiment, the quantum rod 100 may further comprise an organic water blocking layer 40 covering the rod-shaped protective layer 30 so that the quantum rod 100 can be isolated from other components such as a dispersant in a quantum rod film composition, thereby improving fluorescence yield and stability of the quantum rod 100. The organic water blocking layer 40 may be composed of a hydrogel. The hydrogel may be composed of a natural hydrophilic polymer, such as cellulose, alginic acid, hyaluronic acid, chitosan, and other polysaccharides, as well as collagen, poly-L-lysine, poly-L-glutamic acid, and other polypeptides. The hydrogel may also be composed of a synthetic hydrophilic polymer, such as polyvinyl alcohol, polyacrylic acid, polymethacrylic acid, polyacrylamide, and poly-N-polyacrylamide.

Please refer to FIG. 1, in an embodiment, the quantum rod 100 may further comprise a plurality of ligands 50 bonded to the rod-shaped protective layer 30. The ligands 50 may comprise organic phosphorus, organic phosphorus oxide, organic phosphoric acid, organic amine, organic carboxylic acid, organic carboxylic acid ester, olefin, alkyl mercaptan, pyridine or a combination thereof. The organic phosphorus may be an organic phosphorus having 3 to 108 carbon atoms, such as trioctylphosphine (TOP) and tributylphosphine (TBP), but is not limited thereto. The organic phosphorus oxide may be an organic phosphorus oxide having 3 to 108 carbon atoms, such as trioctylphosphine oxide (TOPO), but is not limited thereto. The organic phosphoric acid may be an organic phosphoric acid having 3 to 108 carbon atoms, such as hexylphosphonic acid (HPA), dodecylphosphonic acid (DDPA), tetradecylphosphonic acid (TDPA), and octadecylphosphonic acid (ODPA), but is not limited thereto. The organic amine may be a primary or secondary amine having 1 to 36 carbon atoms, such as oleylamine (OLA), dodecylamine (DDA), tetradecylamine (TDA), cetylamine (HDA), octadecylamine (ODA), and polyethyleneimine (PEI), but is not limited thereto. The organic carboxylic acid may be an organic carboxylic acid having 2 to 30 carbon atoms, such as oleic acid, stearic acid, myristic acid, mercaptoacetic acid, and mercaptoundecanoic acid, but is not limited thereto. The organic carboxylic acid ester may be a carboxylic acid ester having 2 to 30 carbon atoms, such as myristic acid, palmitic acid, lauric acid, stearic acid, and oleic acid, but is not limited thereto. The olefin may be 1-octadecene (ODE) but is not limited thereto. The alkyl mercaptan may be hexadecane mercaptan or hexane mercaptan but is not limited thereto. The ligands 50 may be bonded to the rod-shaped protective layer 30 in any suitable manner, such as deprotonating an organic carboxylic acid. The ligands 50 are configured to make the quantum rod 100 easier to disperse in a solvent. The ligands 50 having hydrophobic or hydrophilic terminal groups may be used depending on a type of the solvent.

A method for manufacturing the quantum rod 100 comprises: forming a spherical cadmium sulfide with a radius of 3 nm to 5 nm as the core 10; then covering the core 10 with zinc selenide having a thickness of 2-5 monomolecular layers as the shell layer 20; subsequently covering the shell layer 20 with zinc sulfide and growing the zinc sulfide into a rod shape to form the rod-shaped protective layer 30. The method for manufacturing the quantum rod 100 further comprises: bonding the ligands 50 to the rod-shaped protective layer 30 and/or covering the rod-shaped protective layer 30 with the organic water blocking layer 40.

Figure 3:
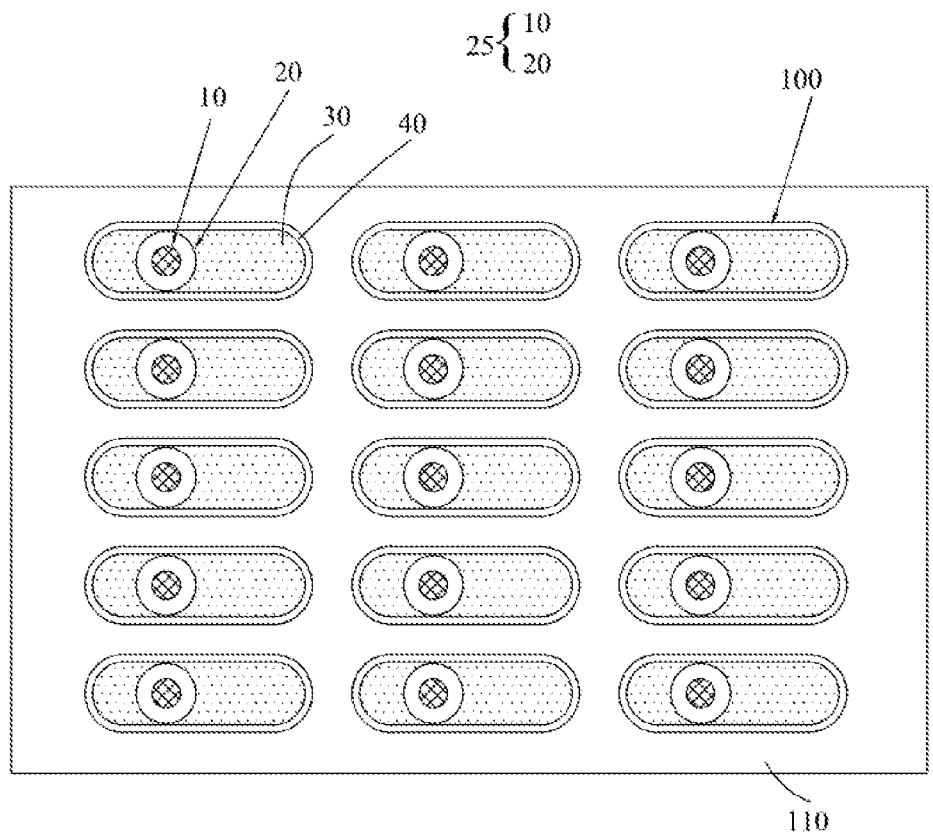
FIG. 3 is a schematic diagram of a quantum rod film with omitted ligands according to an embodiment of the present disclosure.

Please refer to FIG. 3, the present disclosure further provides a quantum rod film 120 comprising a thin film 110 and a plurality of the quantum rods 100 (whose ligands 50 are omitted) as shown in FIG. 1 aligned in the thin film 110 in an orientation. Long axes of the quantum rods 100 are parallel to each other. In this embodiment, the long axes of the quantum rods 100 are parallel to the thin film. In an embodiment, the long axes of the quantum rods 100 may not be parallel to the thin film 110. The quantum rods 100 in the quantum rod film 120 can emit green linearly polarized light under excitation of blue light. Therefore, the quantum rod film 120 can be used as a built-in polarizer of a display panel or a polarizer disposed between a display panel and a blue backlight module to improve transmittance, brightness, and a display color gamut of the display panels. The quantum rod film 120 may further comprise blue light quantum dots/rods and red light quantum dots/rods. When the blue backlight illuminates the quantum rod film 120, light emitted by the quantum rod film 120 is white linearly polarized light composed of red linearly polarized light, green linearly polarized light, and blue linearly polarized light. When the quantum rod film 120 is to be configured as a polarizer, a method for manufacturing the quantum rod film 120 comprises: dispersing the quantum rods 100 in a thermal curing adhesive or an ultraviolet curing adhesive; optionally adding other components such as a dispersant; coating them on a substrate to form a film; arranging the quantum rods 100 in a same direction by a stretching method, an electric driving method, an optical alignment method, and the like; and curing the film into the quantum rod film 120 with heat or ultraviolet. The thermal curing adhesive may be an epoxy resin, a silica gel, polymethyl methacrylate (PMMA), polycarbonate (PC), or a combination thereof, but is not limited thereto. The ultraviolet curing adhesive may be an acrylic resin but is not limited thereto. That is, the thin film 110 comprises a thermal curing adhesive or an ultraviolet curing adhesive.

In addition, the quantum rod film 120 may also be patterned to form a plurality of green filter units of a color filter. When the quantum rod film 120 is to be configured as green filter units, a method for manufacturing the quantum rod film 120 comprises: dispersing the quantum rods 100 in a photoresist, preferably a negative photoresist; coating them on a substrate to form a film; arranging the quantum rods 100 in a same direction by a stretching method, an electric driving method, an optical alignment method, and the like; curing the film into the quantum rod film 120; and patterning the quantum rod film 120 into the green filter units by a photolithography process. That is, the thin film 110 comprises a photoresist, preferably a negative photoresist. When the quantum rod film 120 is to be configured as green filter units, a method for manufacturing the quantum rod film 120 may also comprise: dispersing the quantum rods 100 in ink for inkjet printing; inkjet printing them to form the green filter units; arranging the quantum rods 100 in a same direction by a stretching method, an electric driving method, an optical alignment method, and the like; and curing the green filter units. The ink for inkjet printing may comprise a film-forming resin, a dispersion resin, a photopolymerizable monomer, a photoinitiator, a leveling agent, and a solvent, but is not limited thereto. That is, the thin film 110 may comprise a resin. For examples of the aforementioned practical applications of the quantum rod film 120, please refer to FIGS. 4-6 and the following description.

Figure 4:
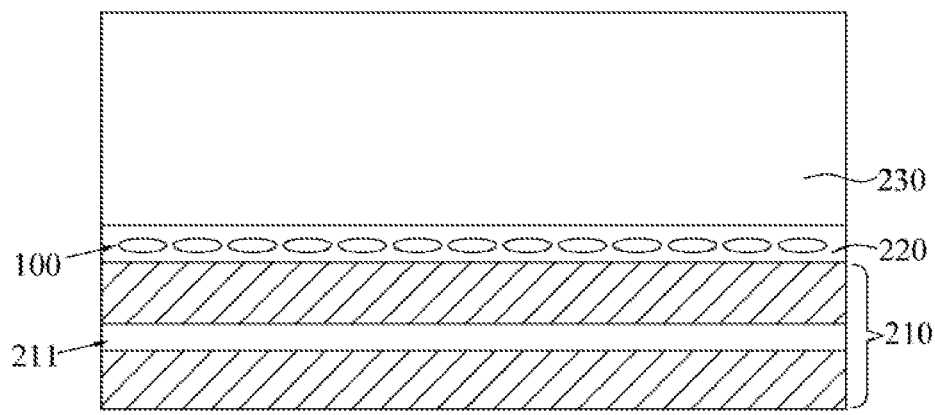
FIG. 4 is a schematic diagram of a display device according to an embodiment of the disclosure.

Please refer to FIG. 4, the present disclosure provides a display device 200 comprising a display panel 230, a backlight module 210, and a first quantum rod film 220 disposed between the backlight module 210 and the display panel 230. The display panel 230 may be a liquid crystal display panel, a light-emitting diode (LED) display panel, or an organic light-emitting diode (OLED) display panel. The blue backlight module 210 comprises a blue light-emitting diode 211. The blue light-emitting diode layer 211 comprises a plurality of blue light-emitting diodes. The first quantum rod film 220 comprises a plurality of the quantum rods 100 as shown in FIG. 1 arranged in an orientation and is configured as a polarizer. In the first quantum rod film 220, the long axes of the quantum rods 100 are parallel to each other and may be parallel to the quantum rod film 220. Each core-shell quantum dot 25 may be located at an end of the rod-shaped protective layer 30 near a side of the first quantum rod film 220. The first quantum rod film 220 may further comprise blue light quantum dots/rods and red light quantum dots/rods. When the blue backlight illuminates the first quantum rod film 220, light emitted by the first quantum rod film 220 is white linearly polarized light composed of red linearly polarized light, green linearly polarized light, and blue linearly polarized light.

Figure 5:
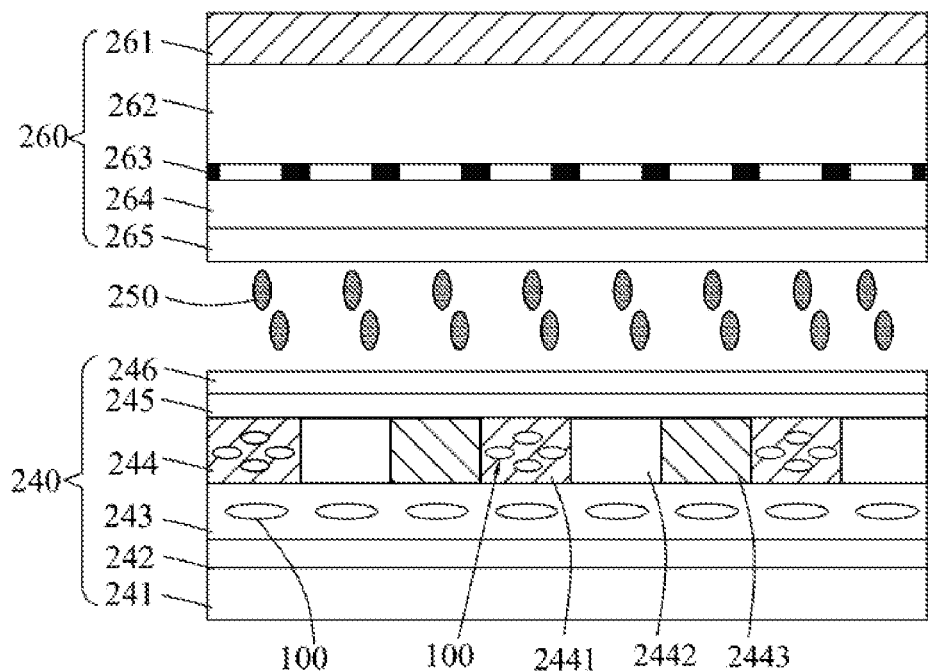
FIG. 5 is a schematic diagram of a display panel of FIG. 4 being a color filter on array (COA) type liquid crystal display panel.

Please refer to FIG. 4 and FIG. 5, in an embodiment, the display panel 230 is a color filter on array (COA) type liquid crystal display panel 231 comprising a first substrate 240, a second substrate 260 disposed opposite to the first substrate 240, and a liquid crystal layer 250 disposed between the first substrate 240 and the second substrate 260. The first substrate 240 sequentially comprises a substrate 241, a thin film transistor layer 242, a second quantum rod film 243, a color filter 284, a pixel electrode layer 245, and an alignment film 246 in a direction from the first substrate 240 to the second substrate 260. The substrate 241 of the first substrate 240 is disposed on the blue backlight module 210. The second quantum rod film 243 comprises a plurality of the quantum rods 100 as shown in FIG. 1 arranged in an orientation and is configured as a polarizer. In the second quantum rod film 243, the long axes of the quantum rods 100 are parallel to each other and may be parallel to the second quantum rod film 243. Each core-shell quantum dot 25 may be located at an end of the rod-shaped protective layer 30 near a side of the second quantum rod film 243. A direction of the long axes of the quantum rods 100 in the second quantum rod film 243 may be same as or different from a direction of the long axes of the quantum rods 100 in the first quantum rod film 220. The second quantum rod film 243 may further comprise blue light quantum dots/rods and red light quantum dots/rods. When the blue backlight illuminates the second quantum rod film 243, light emitted by the second quantum rod film 243 is white linearly polarized light composed of red linearly polarized light, green linearly polarized light, and blue linearly polarized light. The second substrate 260 comprises a polarizer 261, a substrate 262, a black matrix 263, a common electrode layer 264, and an alignment film 265 in a direction from the second substrate 260 to the first substrate 240. In an embodiment, the color filter 284 comprises a plurality of green filter units 2841, a plurality of red filter units 2842, and a plurality of blue filter units 2843. The green filter units 2841 comprise a plurality of the quantum rods 100 as shown in FIG. 1 arranged in an orientation. A direction of the long axes of the quantum rods 100 in the green filter units 2841, the direction of the long axes of the quantum rods 100 in the first quantum rod film 220, and the direction of the long axes of the quantum rods 100 in the second quantum rod film 243 may be same, partially same, or completely different. In terms of total size, a radius of the core 10, a thickness of the shell layer 20, an aspect ratio of the rod-shaped protective layer 30, a type of the organic water blocking layer 40, and a type of the ligand 50, the quantum rods 100 in the green filter units 2841, the quantum rods 100 in the first quantum rod film 220, and the quantum rods 100 in the second quantum rod film 243 may be same, partially same, or completely different. The display panel 230 is not limited to the COA type liquid crystal display panel 231 shown in FIG. 5, and may be a COA type liquid crystal display panel having another structure.

Figure 6:
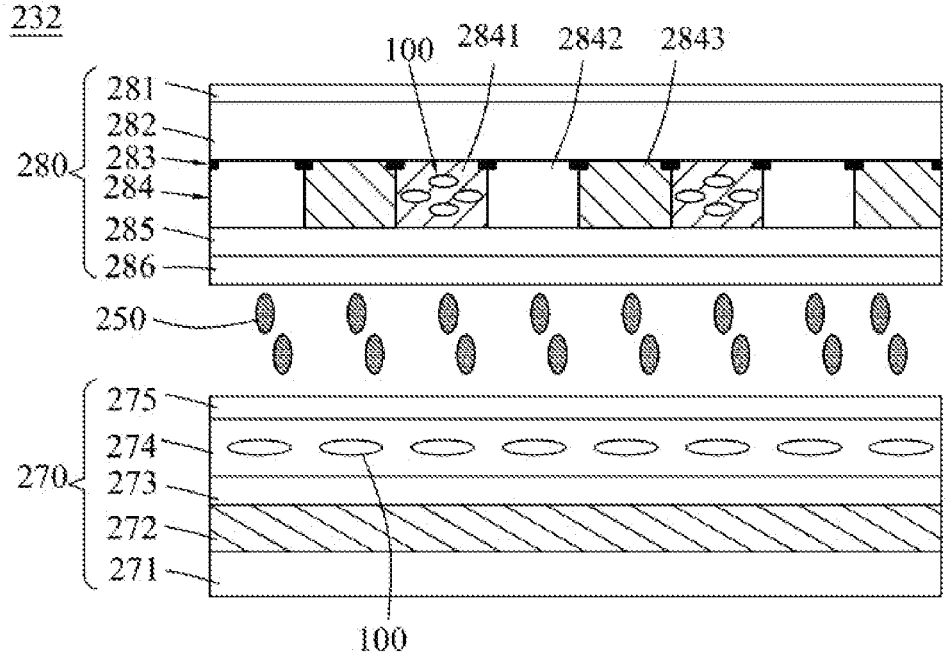
FIG. 6 is a schematic diagram of the display panel of FIG. 4 being a non-COA type liquid crystal display panel.

Please refer to FIG. 4 and FIG. 6, in an embodiment, the display panel 230 is a non-COA type liquid crystal display panel 232 comprising a first substrate 270, a second substrate 280 disposed opposite to the first substrate 270, and a liquid crystal layer 250 disposed between the first substrate 270 and the second substrate 280. The first substrate 270 sequentially comprises a substrate 271, a thin film transistor layer 272, a pixel electrode layer 273, a second quantum rod film 274, and an alignment film 275 in a direction from the first substrate 270 to the second substrate 280. The substrate 271 of the first substrate 270 is disposed on the blue backlight module 210. The second quantum rod film 274 comprises a plurality of the quantum rods 100 as shown in FIG. 1 arranged in an orientation and is configured as a polarizer. In the second quantum rod film 274, the long axes of the quantum rods 100 are parallel to each other and may be parallel to the second quantum rod film 274. Each core-shell quantum dot 25 may be located at an end of the rod-shaped protective layer 30 near a side of the second quantum rod film 274. A direction of the long axes of the quantum rods 100 in the second quantum rod film 274 may be same as or different from the direction of the long axes of the quantum rods 100 in the first quantum rod film 220. The second quantum rod film 274 may further comprise blue light quantum dots/rods and red light quantum dots/rods. When the blue backlight illuminates the second quantum rod film 274, light emitted by the second quantum rod film 274 is white linearly polarized light composed of red linearly polarized light, green linearly polarized light, and blue linearly polarized light. The second substrate 280 comprises a polarizer 281, a substrate 282, a black matrix 283, a color filter 284, a common electrode layer 285, and an alignment film 286 in a direction from the second substrate 280 to the first substrate 270. In an embodiment, the color filter 284 comprises a plurality of green filter units 2841, a plurality of red filter units 2842, and a plurality of blue filter units 2843. The green filter units 2841 comprise a plurality of the quantum rods 100 as shown in FIG. 1 arranged in an orientation. A direction of the long axes of the quantum rods 100 in the green filter units 2841, the direction of the long axes of the quantum rods 100 in the first quantum rod film 220, and the direction of the long axes of the quantum rods 100 in the second quantum rod film 274 may be same, partially same, or completely different. In terms of total size, a radius of the core 10, a thickness of the shell layer 20, an aspect ratio of the rod-shaped protective layer 30, a type of the organic water blocking layer 40, and a type of the ligand 50, the quantum rods 100 in the green filter units 2841, the quantum rods 100 in the first quantum rod film 220, and the quantum rods 100 in the second quantum rod film 274 may be same, partially same, or completely different. The display panel 230 is not limited to the non-COA type liquid crystal display panel 232 shown in FIG. 6, and may be a non-COA type liquid crystal display panel having another structure.

In a quantum rod of the present invention, (1) a blue-green light-emitting cadmium sulfide core is used, (2) a zinc selenide shell layer is used to cover the core, so that blue-green light emitted by the core is red-shifted to green light, thereby forming a green light-emitting core-shell quantum dot, (3) a zinc sulfide rod-shaped protective layer is used to cover the core-shell quantum dot, so that the green light emitted by the core-shell quantum dot is polarized and quantum confinement effect is improved, thereby improving luminous efficiency and reliability. The quantum rod of the present invention has an excitation wavelength of about 445-450 nm and an excitation peak of about 450 nm, which are close to an emission wavelength of 447-452 nm of blue light-emitting diodes in a common blue light backlight source. Therefore, the quantum rod of the present invention has a high absorption efficiency of the blue light backlight source and thus has high excitation efficiency. The quantum rod of the present invention emits green light with a wavelength of about 520-550 nm, and its emission peak can be adjusted by adjusting a size of the core and a thickness of the shell layer. The emission peak is preferably about 525 nm. The light emitted by the quantum rod of the present invention has polarization and thus has high transmittance to a polarizer. Therefore, applying a quantum rod film composed of the quantum rod of the present invention to a display device, for example, as a polarizer disposed between a backlight module and a display panel, as a polarizer disposed in the display panel, or, after being patterned, as green filter units of a color filter, can improve performance of the display device.

The present application has been described in the above preferred embodiments, but the preferred embodiments are not intended to limit the scope of the present application, and those skilled in the art may make various modifications without departing from the scope of the present application. The scope of the present application is determined by claims.

What is claimed is:

1. A quantum rod, comprising:
   a core composed of cadmium sulfide, the core being a sphere with a radius of 3 nm to 5 nm;
   a shell layer composed of zinc selenide and covering the core; and
   a rod-shaped protective layer composed of zinc sulfide and covering the shell layer;
   wherein the quantum rod has an excitation wavelength of 445 nm to 450 nm.

2. The quantum rod according to claim 1, wherein an emission peak of the quantum rod can be adjusted by adjusting a size of the core and a thickness of the shell layer.

3. The quantum rod according to claim 1, further comprising an organic water blocking layer covering the rod-shaped protective layer.

4. The quantum rod according to claim 3, wherein the organic water blocking layer is composed of a hydrogel.

5. The quantum rod according to claim 1, further comprising a plurality of ligands bonded to the rod-shaped protective layer.

6. The quantum rod according to claim 5, wherein the ligands comprise organic phosphorus, organic phosphorus oxide, organic phosphoric acid, organic amine, organic carboxylic acid, organic carboxylic acid ester, olefin, alkyl mercaptan, pyridine, or a combination thereof.

7. A quantum rod film, comprising a thin film and a plurality of quantum rods aligned in the thin film in an orientation, wherein each of the quantum rods comprises:
   a core composed of cadmium sulfide, and the core is a sphere with a radius of 3 nm to 5 nm;
   a shell layer composed of zinc selenide and covering the core; and
   a rod-shaped protective layer composed of zinc sulfide and covering the shell layer
   wherein the quantum rod has an excitation wavelength of 445 nm to 450 nm.

8. The quantum rod film according to claim 7, wherein long axes of the quantum rods are parallel to each other and the thin film.

9. The quantum rod film according to claim 7, wherein an emission peak of the quantum rod can be adjusted by adjusting a size of the core and a thickness of the shell layer.

10. The quantum rod film according to claim 7, further comprising an organic water blocking layer covering the rod-shaped protective layer.

11. The quantum rod film according to claim 10, wherein the organic water blocking layer is composed of a hydrogel.

12. The quantum rod film according to claim 7, further comprising a plurality of ligands bonded to the rod-shaped protective layer.

13. The quantum rod film according to claim 12, wherein the ligands comprise organic phosphorus, organic phosphorus oxide, organic phosphoric acid, organic amine, organic carboxylic acid, organic carboxylic acid ester, olefin, alkyl mercaptan, pyridine, or a combination thereof.

14. A display device, comprising a display panel, a backlight module, and a first quantum rod film disposed between the backlight module and the display panel, wherein the first quantum rod film comprises a plurality of first quantum rods arranged in an orientation, and each of the first quantum rods comprises:
  a core composed of cadmium sulfide, and the core is a sphere with a radius of 3 nm to 5 nm;
  a shell layer composed of zinc selenide and covering the core; and
  a rod-shaped protective layer composed of zinc sulfide and covering the shell layer
  wherein the quantum rod has an excitation wavelength of 445 nm to 450 nm.

15. The display device according to claim 14, wherein an emission peak of the quantum rod can be adjusted by adjusting a size of the core and a thickness of the shell layer.

16. The display device according to claim 14, further comprising an organic water blocking layer covering the rod-shaped protective layer.

17. The display device according to claim 14, further comprising a plurality of ligands bonded to the rod-shaped protective layer.

18. The display device according to claim 17, wherein the ligands comprise organic phosphorus, organic phosphorus oxide, organic phosphoric acid, organic amine, organic carboxylic acid, organic carboxylic acid ester, olefin, alkyl mercaptan, pyridine, or a combination thereof.

19. The display device according to claim 14, wherein the display panel is a liquid crystal display panel comprising a first substrate, a second substrate disposed opposite to the first substrate, and a liquid crystal layer disposed between the first substrate and the second substrate, the first substrate sequentially comprises a substrate, a thin film transistor layer, and a second quantum rod film in a direction from the first substrate to the second substrate, the second quantum rod film comprises a plurality of second quantum rods arranged in an orientation, and structures of the second quantum rods are same as structures of the first quantum rods.

20. The display device according to claim 14, wherein the first substrate or the second substrate comprises a color filter, the color filter comprises a plurality of green filter units, a plurality of red filter units, and a plurality of blue filter units, the green filter units comprise a plurality of third quantum rods arranged in an orientation, and structures of the third quantum rods are same as structures of the first quantum rods.

* * * * *